Sept. 26, 1950     G. G. HOLDSWORTH     2,523,570
SPRING RETAINER FOR SPRING ACTUATED POPPET VALVES
Filed March 5, 1947

INVENTOR.
George G. Holdsworth
BY
Mawhinney & Mawhinney
Attorneys

Patented Sept. 26, 1950

2,523,570

UNITED STATES PATENT OFFICE 2,523,570

SPRING RETAINER FOR SPRING ACTUATED POPPET VALVES

George Geoffrey Holdsworth, Coventry, England

Application March 5, 1947, Serial No. 732,541
In Great Britain November 7, 1946

3 Claims. (Cl. 251—144)

This invention relates to a poppet valve—for example, for an internal-combustion engine, a reciprocating compressor or the like—the main object being to provide an improved abutment, for the valve spring, which can be inexpensively constructed and assembled on the valve stem or removed therefrom in a simple manner, without the possibility of loss of small parts as is often the case with present-day cotters of the split taper bush variety.

The invention consists in the combination with a poppet valve having, remote from its head, a peripheral groove the bottom wall of which comprises a cylindrical portion adjoining, remote from the head, a tapering portion (i. e., a portion of gradually-increasing diameter), of an abutment for the valve spring (and this latter term is used generically to cover one or more coil compression springs, hair-pin springs or the like), the abutment being in the form of a disc having a radial slot which will just receive the cylindrical portion of the groove at the centre of the disc, the inner end of the slot being axially tapered according to the taper of the said tapering portion so as to bind thereon under the action of the spring.

The invention further consists in an abutment disc, as aforesaid, for the spring of a poppet valve having, remote from its head, a peripheral groove the bottom wall of which comprises a cylindrical portion adjoining, remote from the head, a tapering portion.

In the accompanying drawings.

Like reference numerals are used throughout the different figures to denote similar parts.

Figure 1:
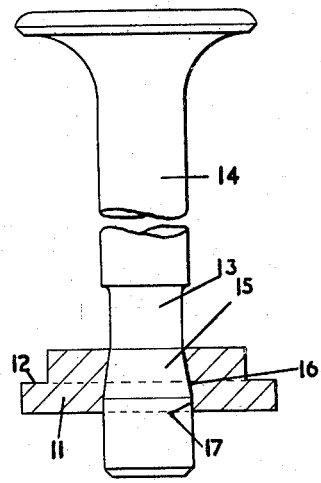
Figure 1 is an elevation of a valve and a sectional view of an abutment thereon, for the valve spring, according to the invention.
Figure 2:
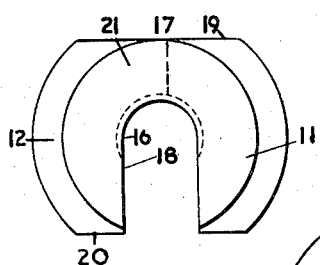
Figure 2 is a plan of the abutment.

In the construction of Figures 1 and 2 the abutment disc 11 is conveniently provided with an external step 12 in a known manner to receive the adjacent end of a coil compression spring or, for example, the limbs of a hair-pin spring. The axial dimension of the disc is substantially equal to the axial dimension of the cylindrical portion 13 of the bottom wall of the groove in the valve stem 14. The tapering portion 15 of the bottom wall of the groove may be of slightly less axial dimension than that of the cylindrical portion as shown, the tapered bore 16 in the disc being of the same axial dimension as the tapering portion 15 and the rest of the bore in the disc being cylindrical, as shown at 17, so as to receive the full width of the valve stem, whereby to assist in locating the disc against rocking movement on the valve stem.

It will be evident that, in order to remove the abutment disc, it is only necessary to compress the valve spring sufficiently towards the fixed abutment at its other end, when the disc can be slid axially (upwardly in Figure 1) and then removed radially, while the stem slides out of the radial slot 18—the reverse process taking place when the disc is being mounted on the valve stem.

The disc need not, of course, be circular. On the contrary, its periphery may have a pair of diametrically-opposite parallel flats, as shown at 19, 20, provided on it (to be, for example, tangential to the non-stepped portion 21 of the disc), these flats being at right angles to the centre line of the slot 18—i. e., one of the flats being bisected by the radial slot. The flats enable the forked end of an appropriate implement to straddle the disc and to be applied to the adjacent portions of a coil spring in order to compress it.

Figure 3:
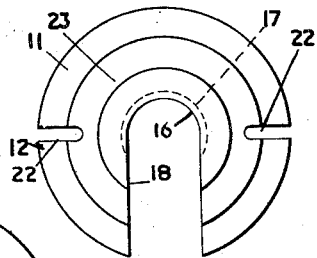
Figure 3 is a plan of an alternative form of abutment according to the invention.

In the alternative arrangement of Figure 3, instead of the flats of Figure 2 there are two oppositely-disposed recesses 22 through which can be passed inturned ends of the prongs of a suitable forked implement. Moreover, Figure 3 shows two steps, 12 and 23, to receive the adjacent ends of a pair of coil springs of different diameters, one within the other.

Figure 4:
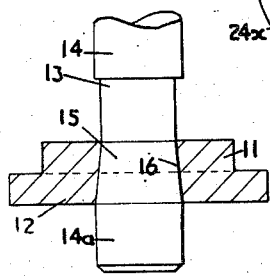
Figures 4 and 5 are views similar to that of Figure 1 but showing modifications.

Alternatively, as shown by Figure 4, the tapering portion 15 may be of the same axial dimension as the cylindrical portion 13, i. e., equal to the axial dimension of the disc 11, in which case there is no cylindrical bore 17 in the disc.

Figure 5:
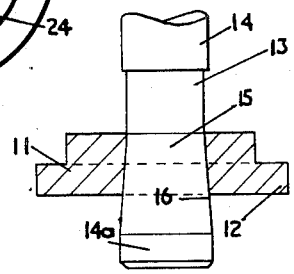

Furthermore, the extremity 14a of the valve may be of the same diameter as the main portion of the valve stem, as shown by Figure 4, or it may be of larger diameter, as shown by Figure 5, the axial dimension of the tapering portion 15 being, if desired, correspondingly increased.

Figure 6:
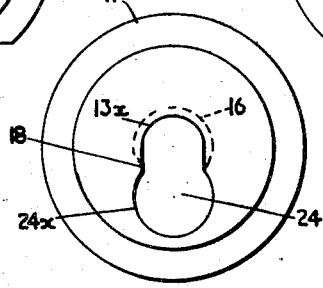
Figure 6 is a plan of another modification.

Moreover, in all the constructions so far described the radial slot 18 breaks into the outer edge of the abutment disc. But it need not. Figure 6 shows an alternative arrangement in which the slot is of very slight length, say, $\tfrac{1}{16}''$, and breaks into a hole 24 which is, of course, slightly eccentric and of a diameter to receive the maximum diameter of the end 14a of the valve stem. The hole 24 can be drilled or broached, and the appropriate edges filed away to provide the slot 18.

The construction of Figure 6 shows a slight saving in production costs, and no flats (such as 19, 20) or recesses (such as 22) need be provided to receive a tool during assembly of the disc on the valve stem against the spring. To assemble, the disc is placed against the spring with the end 14a of the stem extending into or through the hole 24, and pressure then applied to the disc, compressing the spring, to bring its slot 18 into alignment with the bottom wall 13 of the groove in the valve stem, when the disc can be slid laterally as necessary and then released to bind on the taper wall 15.

It will be understood that in the extreme case, when the slot 18 is of precisely no length, the hole 24 is disposed so that the chord of intersection (in a geometrical sense) of the circles $24x$ and $13x$ (Figure 6) is a diameter of the circle $13x$.

What I claim as my invention and desire to secure by Letters Patent of the United States is:

1. For the spring of a poppet valve having, at a part of its stem remote from its head, a peripheral groove of which the bottom wall, in a radial direction, comprises a cylindrical portion adjoining, remote from the head, a tapering portion, an abutment in the form of a disc having a radial slot with parallel sides spaced from one another to just receive the said cylindrical portion, the inner end of the slot being centrally of the disc and axially tapered according to the taper of said tapering portion and arranged so that the disc will bind centrally on said tapering portion under the action of the spring, and the outer end of the slot being part-cylindrical and of a diameter to just receive the free end of the valve stem beyond said tapering portion.

2. The combination with a poppet valve having at a part of its stem remote from its head, a peripheral groove of which the bottom wall, in a radial direction, comprises a cylindrical portion adjoining, remote from the head, a tapering portion, of an abutment, for the valve spring, in the form of a disc having a radial slot with parallel sides spaced from one another to just receive the said cylindrical portion, the inner end of the slot being centrally of the disc and axially tapered according to the taper of said tapering portion and arranged so that the disc will bind centrally on said tapering portion under the action of the spring, and the outer end of the slot being part-cylindrical and of a diameter to just receive the free end of the valve stem beyond said tapering portion.

3. A spring abutment disc, for a poppet valve, having an axially tapered central hole to just receive a corresponding tapering portion of the valve stem, and having an axially cylindrical hole, intersecting said tapered hole, of a diameter to just receive the maximum diameter of the valve stem, said cylindrical hole intersecting said tapered hole to form a chord, at the larger face of said tapered hole, which is equal to the diameter of the smaller face of said tapered hole, and said tapered hole having parallel flats in it extending between said chord and the diametrical line of said hole which is parallel to said chord.

GEORGE GEOFFREY HOLDSWORTH.

REFERENCES CITED

The following references are of record in the file of this patent:

UNITED STATES PATENTS

| Number | Name | Date |
| --- | --- | --- |
| 972,434 | Blomberg | Oct. 11, 1910 |
| 1,193,738 | Thoms | Aug. 8, 1916 |
| 1,640,118 | Ford | Aug. 23, 1927 |
| 1,975,699 | Olson | Oct. 2, 1934 |
| 2,165,238 | Douglas et al. | July 11, 1939 |